(12) United States Patent
Bellamy et al.

(10) Patent No.: US 10,066,987 B1
(45) Date of Patent: Sep. 4, 2018

(54) USING ULTRAVIOLET SENSOR DATA TO DETERMINE A PSEUDO LOCATION OF A USER

(71) Applicant: International Business Machines Corporation, Armonk, NY (US)

(72) Inventors: Rachel Bellamy, Bedford, NY (US); Victor C. Dibia, Whiteplains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/447,953

(22) Filed: Mar. 2, 2017

(51) Int. Cl.
*G01J 1/26* (2006.01)
*G01J 1/42* (2006.01)
*H04W 4/02* (2018.01)
*H04W 4/029* (2018.01)

(52) U.S. Cl.
CPC .............. *G01J 1/429* (2013.01); *G01J 1/4204* (2013.01); *G01J 2001/4266* (2013.01); *H04W 4/028* (2013.01); *H04W 4/029* (2018.02)

(58) Field of Classification Search
CPC .. G01J 1/429; G01J 2001/4266; G01J 1/0233; G01J 1/4204; G01J 2001/0485; H04W 4/02; H04W 4/14; H04W 4/028
USPC ........................................................ 250/372
See application file for complete search history.

(56) References Cited

U.S. PATENT DOCUMENTS

| | | | |
|---|---|---|---|
| 7,467,043 B1* | 12/2008 | Estupinan | G01J 1/02 702/3 |
| 9,237,855 B2 | 1/2016 | Hong et al. | |
| 9,360,364 B2* | 6/2016 | Hingorani | G01J 1/4204 |
| 9,479,250 B2 | 10/2016 | Mitchell | |
| 2006/0289779 A1* | 12/2006 | Marmaropoulos | G01D 21/00 250/372 |
| 2011/0309248 A1* | 12/2011 | Thoma | G01J 1/0407 250/339.06 |
| 2011/0309942 A1* | 12/2011 | Hyde | G08B 3/10 340/600 |
| 2015/0041663 A1* | 2/2015 | Oliver | G01J 1/0219 250/372 |
| 2015/0294080 A1* | 10/2015 | Garnavi | G06F 19/3431 702/19 |
| 2015/0346024 A1 | 12/2015 | Hingorani et al. | |
| 2016/0029890 A1* | 2/2016 | Stump | G16H 50/30 600/301 |

(Continued)

OTHER PUBLICATIONS

Author: Niu Ben et al., Title: Pseudo-Location Updating System for Privacy-Preserving Location-Based Services, Date: Sep. 2013, Publisher: China Communication.*

(Continued)

*Primary Examiner* — Taeho Jo
(74) *Attorney, Agent, or Firm* — Cantor Colburn LLP; Yeen Tham (57) ABSTRACT

Embodiments of the invention are directed to a method for determining a pseudo location of a user. The method includes collecting, by a processing device, ultraviolet (UV) sensor data from a UV sensor of a user device of the user. The method further includes analyzing, by the processing device, the UV sensor data by comparing the UV sensor data to a UV profile for a geographic area. The method further includes determining, by the processing device, the pseudo location of the user based at least in part on the UV sensor data and the UV profile.

20 Claims, 7 Drawing Sheets

(56) References Cited

U.S. PATENT DOCUMENTS

| | | | |
|---|---|---|---|
| 2016/0048298 A1* | 2/2016 | Choi | G06F 3/04842 |
| | | | 715/846 |
| 2016/0271282 A1* | 9/2016 | Trapani | A61L 2/202 |
| 2016/0275639 A1* | 9/2016 | Holub | H04N 19/124 |
| 2016/0285985 A1* | 9/2016 | Molettiere | H04L 67/22 |
| 2016/0305819 A1* | 10/2016 | Lian | G01J 1/44 |
| 2016/0371951 A1* | 12/2016 | Peleg | H04W 4/02 |
| 2017/0069192 A1* | 3/2017 | Sood | G01J 1/429 |
| 2017/0124832 A1* | 5/2017 | Jobin | G08B 21/02 |
| 2017/0160819 A1* | 6/2017 | Yi | G06F 3/0416 |
| 2017/0168625 A1* | 6/2017 | Shin | G06F 1/163 |
| 2017/0238143 A1* | 8/2017 | Park | H04W 4/028 |
| | | | 455/456.6 |

OTHER PUBLICATIONS

Rene Hanse, et al.," Seamless Indoor/Outdoor Positioning Handover for Location-Based Services in Streamspin", IEEE Computer Society, 2009, p. 1-6.

* cited by examiner

USING ULTRAVIOLET SENSOR DATA TO DETERMINE A PSEUDO LOCATION OF A USER

BACKGROUND

The present invention generally relates to processing systems and, more particularly, relates to determining a pseudo location of a user based at least in part on ultraviolet sensor data.

A processing system can track a user's location. For example, a processing system can use global positioning system (GPS) data, wireless network data (e.g., cellular networks, wireless local area networks, etc.), or other types of data to track a user's location. GPS data can be used to determine and track the precise location of a device equipped with a GPS. Similarly, wireless network data can be used to triangulate the position of a device connected to the wireless network. In an enterprise/workplace environment, an employer can track a user's location to verify presence, hours worked, clocking in/clocking out, etc. In a domestic environment, a parent can track his child's location (e.g., at school, outside, at home, etc.) or a caregiver can track a patient's location.

SUMMARY

According to embodiments of the present invention, techniques including methods, systems, and/or computer program products for determining a pseudo location of a user based at least in part on ultraviolet sensor data are provided. An example method includes collecting, by a processing device, ultraviolet (UV) sensor data from a UV sensor of a user device of the user. The method further includes analyzing, by the processing device, the UV sensor data by comparing the UV sensor data to a UV profile for a geographic area. The method further includes determining, by the processing device, the pseudo location of the user based at least in part on the UV sensor data and the UV profile.

Additional features and advantages are realized through the techniques of the present invention. Other aspects are described in detail herein and are considered a part of the invention. For a better understanding of the present invention with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Although processing devices can track a user's location using existing techniques, such as GPS, wireless networks, etc., the relatively high precision of these approaches can compromise the user's privacy. For example, GPS tracking can pinpoint exact positions of a user, which can compromise a user's privacy. Users typically value privacy and may not be inclined to agree to tracking that compromises the user's privacy. Additionally, GPS tracking may not work when the tracking target is indoors, under covered areas (e.g., under overpasses, etc.), or in areas without reliable satellite coverage. Wireless network tracking suffers from similar deficiencies.

To address these problems, embodiments of the present invention use privacy-preserving location mechanisms that reveal only minimal information needed to determine a user's pseudo location. In doing so, embodiments of the present invention minimize the risk of secondary interpretation of data and compromising a user's privacy. Accordingly, the present invention provides a user's pseudo location, which represents an estimated (as opposed to exact) location of the user.

Embodiments of the present invention determine a user's pseudo location by estimating the user's location based at least in part on ultraviolet (UV) sensor data collected from the user's mobile computing device (e.g., a smartphone, a wearable computing device, etc.). Embodiments of the present invention analyze UV readings collected via the user's device to approximate the user's location, such as within a building or greater geographical area. This analysis can also utilize known environmental parameters such as time of day, expected UV readings at certain locations within a building (e.g., indoors, close to a window, outdoors, in a moving vehicle, etc.) and other sensor data (e.g., accelerometer data, gyroscope data, etc.).

Embodiments of the present invention can have applications in the healthcare industry. For example, some healthcare providers require that participants be "active" (e.g., take walks and engage in outdoor activities). GPS and/or wireless network tracking may not provide suitable tracking for at least two reasons. First, these tracking approaches can track a patient beyond their desired privacy to include tracking information about other activities unrelated to being active. Second, given the granularity limitations of GPS and wireless network tracking, these approaches can be unable to make distinctions between indoor and outdoor locations. In such a scenario, health devices like activity monitors used for health-tracking can be fitted with processors and UV sensors in accordance with embodiments of the invention to infer a user's pseudo location (e.g., indoors, outdoors, etc.).

Embodiments of the present invention can also have applications in the legal/judicial industry. For example, embodiments of the invention can be applied to estimate the location of an individual in situations where the precision provided by GPS coordinates would be inappropriate because of strong privacy concerns associated with GPS tracking. Gathering and using UV sensor data to estimate a user location in accordance with embodiments of the invention provides fewer privacy concerns. For example, in legal cases that can depend on establishing that an individual was in a certain location, was indoor or outdoor, or was not in a certain location, the present invention can be used to substantiate an estimated or pseudo location of the individual without violating the user's other privacy rights.

Figure 1:
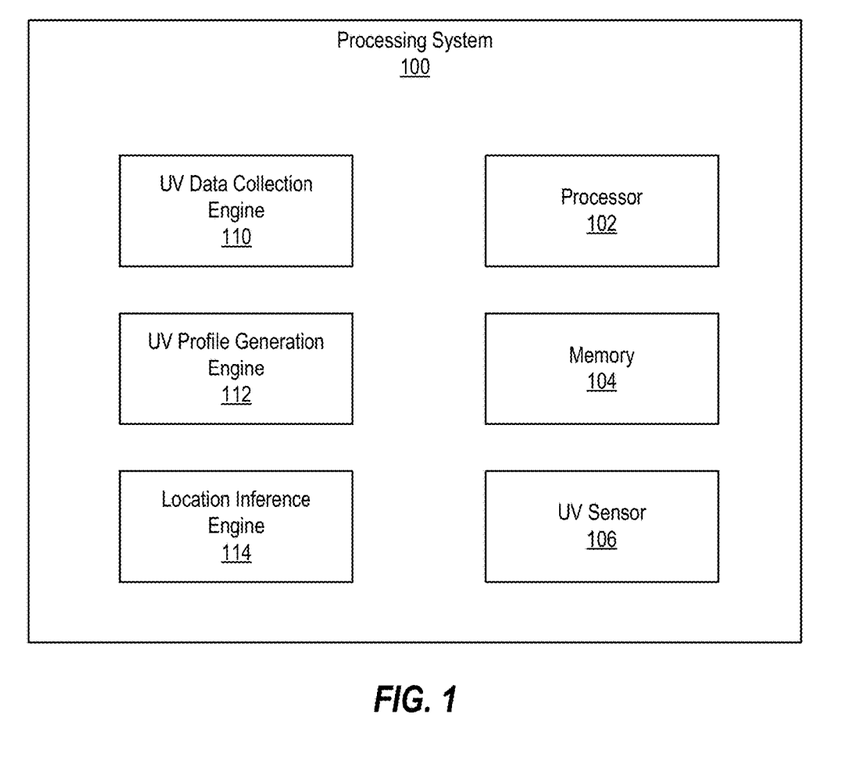
FIG. 1 illustrates a block diagram of a processing system for determining a pseudo location of a user based at least in part on ultraviolet sensor data according to embodiments of the present invention.

FIG. 1 illustrates a block diagram of a processing system 100 for determining a pseudo location of a user based at least in part on ultraviolet sensor data according to embodiments of the present invention. The processing system 100 can be implemented as any suitable computing device, including but not limited to, a wearable computing device (e.g., a smart watch, an activity tracker, etc.), a smart phone, a tablet computing device, a laptop, and the like.

The processing system 100 includes a UV data collection engine 110, a UV profile generation engine 112, a location inference engine 114, a processor 102, a memory 104, and a UV sensor 106, configured and arranged as shown. The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. According to embodiments of the present invention, the engine(s) described herein can be a combination of hardware and programming. The programming can be processor executable instructions stored on a tangible memory, and the hardware can include a processor 102 for executing those instructions. Thus a system memory (e.g., the memory 104) can store program instructions that when executed by the processing device 102 implement the engines described herein. Other engines can also be utilized to include other features and functionality described in other examples herein.

Alternatively or additionally, the processing system 100 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The UV data collection engine 110 collects UV sensor data from the UV sensor 106 of the processing system 100. For example, the UV data collection engine 110 collects the UV sensor data from the UV sensor 106 periodically, such as every 0.5 seconds, ever 3 seconds, every 15 seconds, every 90 seconds, etc. In some embodiments, the UV data collection engine 110 collects the UV sensor data from the UV sensor 106 based at least in part on a change in the UV value. For example, if the UV sensor 106 detects a change in UV value, the UV sensor 106 can send the UV sensor data to the UV data collection engine 110 for collection.

According to example embodiments, the processing system 100 can include additional sensors (not shown), such as accelerometers, gyroscopes, etc. In such embodiments, the UV data collection engine 100 (or another suitable engine) also collects sensor data from the additional sensors. The data collected from the additional sensors can be used in conjunction with the UV data to determine the user's pseudo location, as described herein.

The UV profile generation engine 112 generates a UV profile for a geographic area by taking UV data samples within the geographic area (e.g., a building) and indexes the locations using the UV data samples. For example, various locations of a geographic area can have different UV levels.

As a user with an equipped device (e.g., the processing system 100) moves throughout the geographic area, the UV sensor 106 observes UV levels and sends UV sensor data to the UV data collection engine 110. The UV profile generation engine 112 uses the UV sensor data to generate a UV profile that indexes (or maps) the UV sensor data to locations within the geographic area. Additionally, the UV profile generation engine 112 can detect environmental parameters and incorporate the environmental parameters into the analysis of the indexed UV sensor data to provide additional information (e.g., time of day, altitude, etc.) about the geographic area.

The UV profile generation engine 112 can include machine learning functionality. According to embodiments of the present invention, the UV profile generation engine 112 is based at least in part on a machine learning model that aggregates multiple features (or parameters as described above) which is then used for efficient matching of new UV profiles. A machine learning system or module includes a trainable machine learning algorithm that can be trained to learn functional relationships between inputs and outputs that are currently unknown. In one or more embodiments, machine learning functionality can be implemented using an artificial neural network (ANN) having the capability to be trained to perform a currently unknown function. The phrase "machine learning" broadly describes a primary function of electronic systems that learn from data. In machine learning and cognitive science, ANNs are a family of statistical learning models inspired by the biological neural networks of animals, and in particular the brain. ANNs can be used to estimate or approximate systems and functions that depend on a large number of inputs and are generally unknown.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

According to embodiments of the present invention, the indexing process can be distributed or "crowdsourced" to enable UV data collection from multiple individuals' devices. This enables a group of individuals to generate and contribute to a UV profile for a particular geographic area. In some embodiments, the UV profile generation engine 112 can be implemented in a cloud computing environment (e.g., cloud computing environment 50 of FIG. 5). In such cases, multiple user devices can collect UV sensor data and send it to the UV profile generation engine 112 in the cloud computing environment. Based at least in part on this data, the UV profile generation engine 112 generates the user profile. According to embodiments of the present invention, the user profile is stored in a suitable data store, such as on the processing system 100, in the cloud environment 50, or in another suitable data store accessible by the processing system 100.

The location inference engine 114 analyzes data collected by the UV data collection engine 110 to determine a pseudo location for the user. Specifically, the location inference engine 114 analyzes the UV sensor data and augments it with secondary sensor information (if any) and environmental factors (e.g., time of day, season, altitude, etc.) to draw location inferences using generated UV profiles. That is, the location inference engine 114 uses the UV data (and possibly other data) to infer or estimate a user's pseudo location by comparing it to the UV profile. Examples of inferences include, but are not limited to that the estimated location is indoors or outdoors; indoors/outdoors activity; and building periphery.

Determining that the estimated location is indoors or outdoors can be performed by evaluating the UV level and UV type. For example, a low/weak UV level and a UV type of UV-a can be indicative of the user being located indoors. UV-a exists indoors and outdoors while UV-b exists outdoors. Indoors/outdoors activity can be determined based at least in part on UV level, UV type, and secondary sensor information. For example, a strong UV level, a UV type of UV-b, and accelerometer data indicating user movement can be indicative of the user running outdoors. Interior building periphery can be determined based at least in part on low/weak to mid-level UV.

The location inference engine 114 also can use environmental factors (e.g., time of day, season, altitude, etc.) to infer a user's pseudo location. Regarding time of day, UV tends to be stronger when the sun is at its highest point in the sky (e.g., between 10 am and 4 pm) and weaker in the early morning and late afternoon. A high UV value can indicate that it is midday, for example.

Regarding the season, UV exposure can be strongest in the summer (e.g., June, July, August) in the northern hemisphere and least in the winter (e.g., December, January, February). However, it should be appreciated that snow can reflect a significant portion of the sun's UV rays. Regarding altitude, the air tends to be leaner and thinner at higher altitudes (as illustrated in the graph 200A of FIG. 2A). Accordingly, UV exposure is stronger in mountains and other higher altitude areas versus valleys or other lower altitude areas. UV can also tend to be stronger at the equator and weaker towards the polls.

Figure 2A:
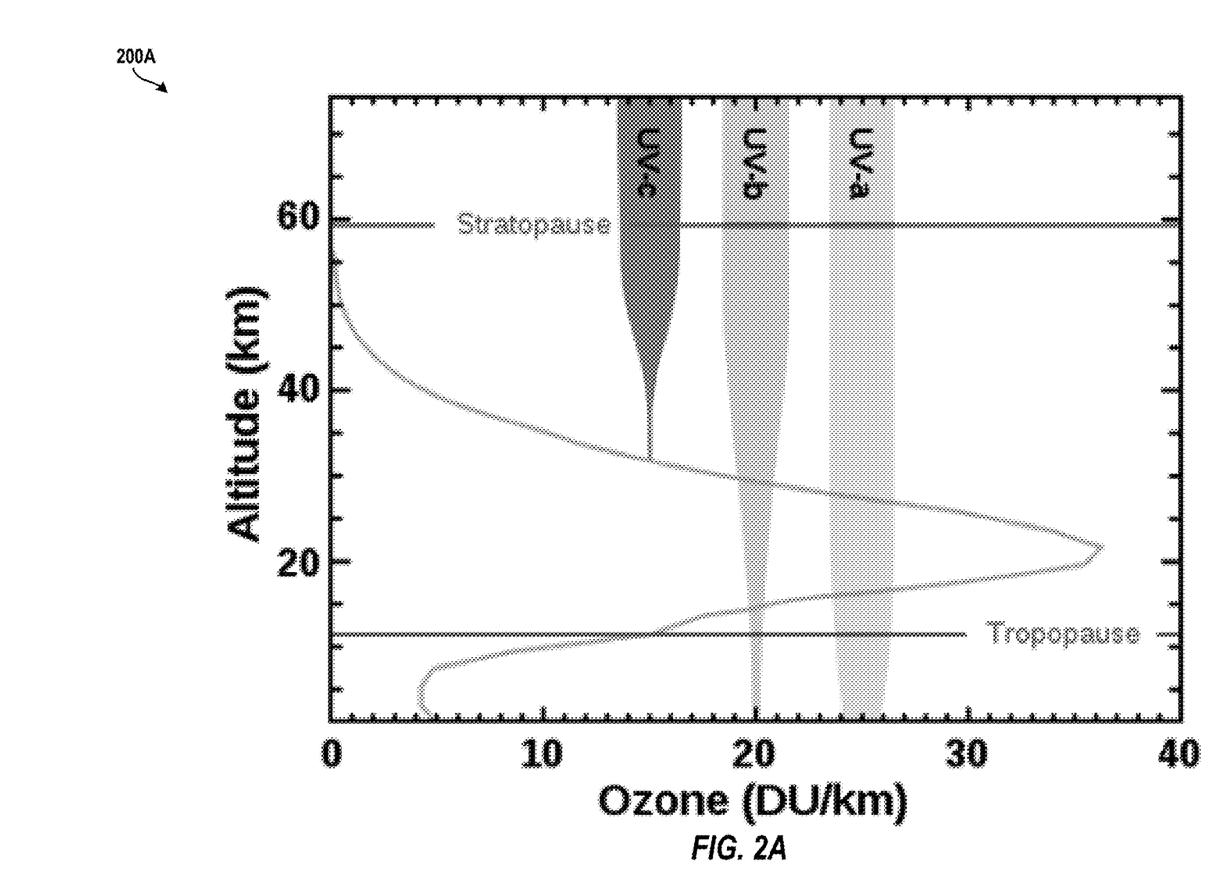
FIG. 2A illustrates a graph of light spectrum plotted as ozone versus altitude according to embodiments of the present invention.
Figure 2B:
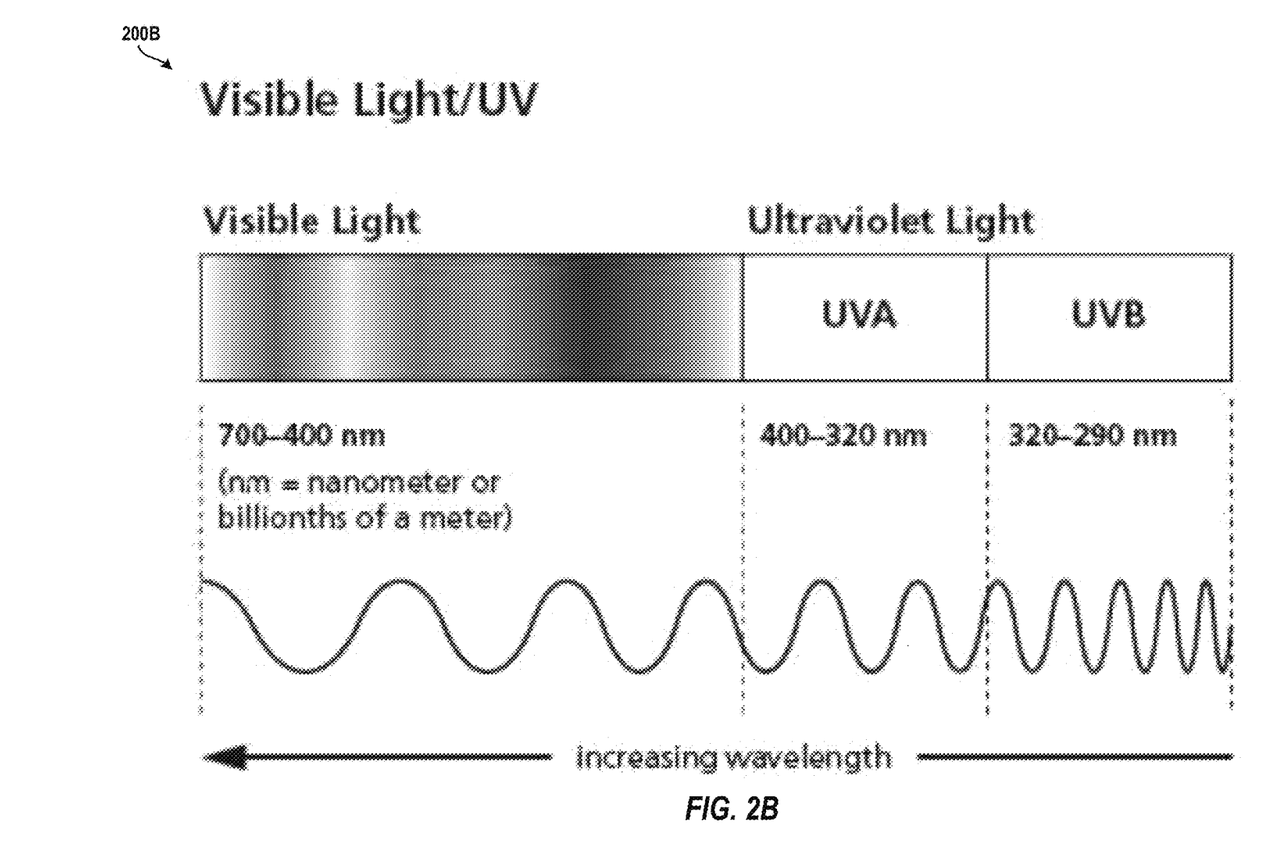
FIG. 2B illustrates a graph of the light spectrum as wavelength from visible light to ultraviolet light according to embodiments of the present invention.

FIG. 2A illustrates a graph 200A of light spectrum plotted as ozone versus altitude. The UV profile generation engine 112 can index locations according to altitude, which can be used by the location inference engine 114 to infer a pseudo location of a user as described herein. FIG. 2B illustrates a graph 200B of the light spectrum as wavelength from visible light to ultraviolet light. The location inference engine 114 can utilize the type of UV and/or the specific wavelength of the light to infer a location of a user.

Figure 3:
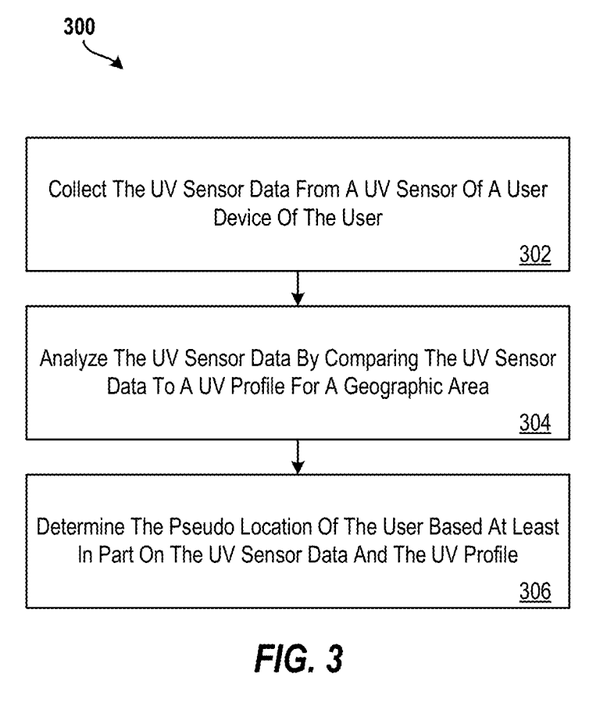
FIG. 3 illustrates a flow diagram of a method for determining a pseudo location of a user based at least in part on ultraviolet sensor data according to embodiments of the present invention.

FIG. 3 illustrates a flow diagram of a method 300 for determining a pseudo location of a user based at least in part on ultraviolet sensor data according to embodiments of the present invention. The method 300 can be implemented in any suitable processing system, such as the processing system 100 of FIG. 1, the processing system 400 of FIG. 4, or any suitable combination thereof.

At block 302, the method 300 includes collecting, by a processing device, the UV sensor data from a UV sensor of a user device of the user. For example, the UV data collection engine 110 collects the UV sensor data at block 302. At block 304, the method 300 includes analyzing, by the processing system, the UV sensor data by comparing the UV sensor data to a UV profile for a geographic area. For example, the location inference engine 114 analyzes the UV sensor data and compares it with a UV profile. By comparing the UV sensor data to the UV profile, it can be determined approximately where the user is located. For example, at block 306, the method 300 includes determining, by the processing device, the pseudo location of the user based at least in part on the UV sensor data and the UV profile. For example, the location inference engine 114 determines the pseudo location of the user. The pseudo location can be one of indoors or outdoors, for example.

Additional processes also can be included. For example, the UV profile module 112 can generate the UV profile for the geographic area based at least in part on prior UV sensor data collected by the user device of the user. According to an additional example embodiment of the present invention, the UV data collection engine 110 collects additional UV sensor data from UV sensors of additional user devices of additional users. The UV profile module 112 then generates the UV profile for the geographic area based at least in part on prior UV sensor data collected by the user device of the user, and based at least in part on the additional UV sensor data collected by the additional user devices of the additional users.

The processes depicted in FIG. 3 represent illustrations, and other processes can be added or existing processes can be removed, modified, or rearranged without departing from the scope and spirit of the present invention.

Figure 4:
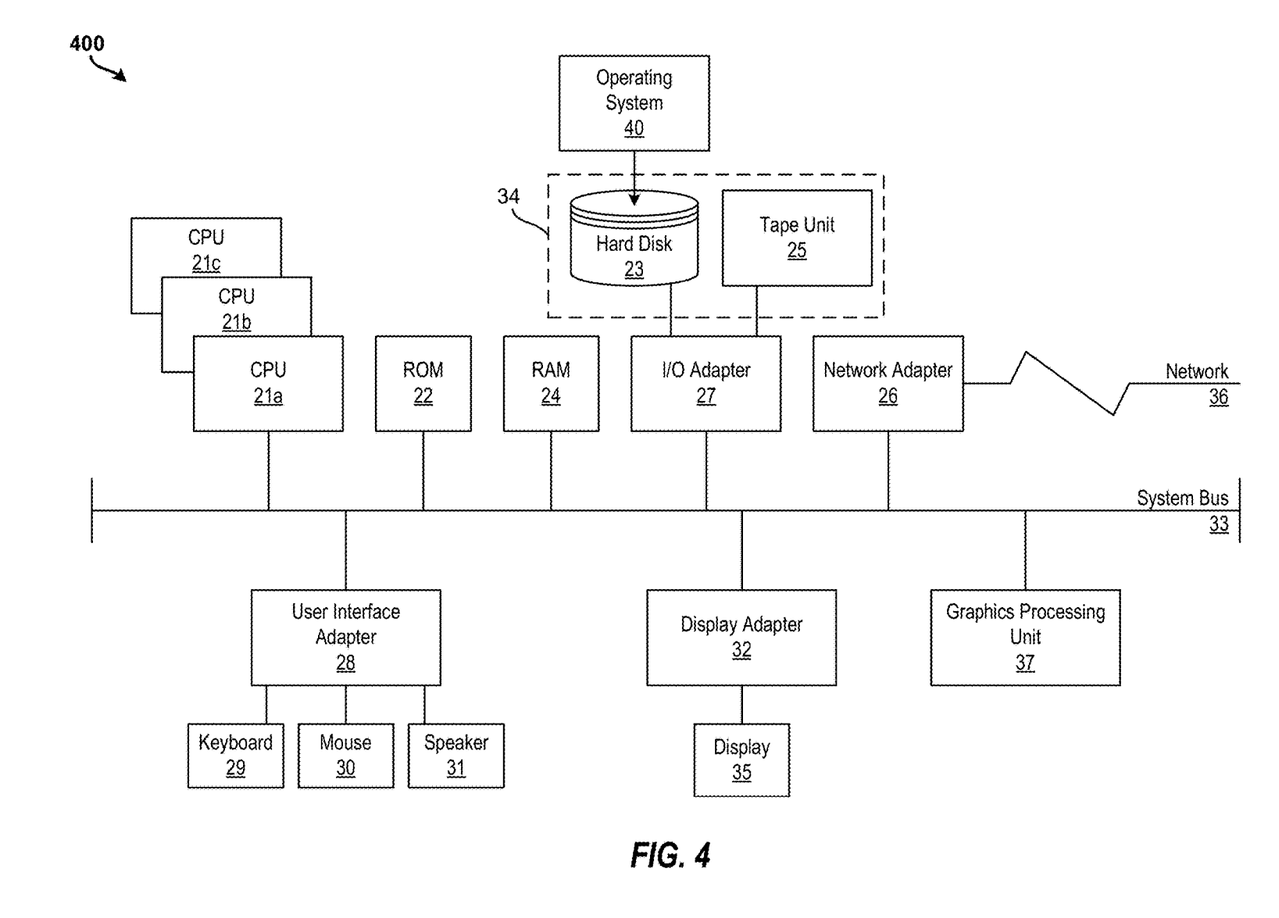
FIG. 4 illustrates a block diagram of a processing system for implementing the techniques described herein according to embodiments of the present invention.

It is understood in advance that the present invention is capable of being implemented in conjunction with any other type of computing environment now known or later developed. For example, FIG. 4 illustrates a block diagram of a processing system 400 for implementing the techniques described herein. In embodiments of the present invention, processing system 20 has one or more central processing units (processors) 21a, 21b, 21c, etc. (collectively or generically referred to as processor(s) 21 and/or as processing device(s)). In aspects of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 20.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 can be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which can include a graphics adapter to improve the performance of graphics intensive applications and a video controller. In one aspect of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present invention, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present invention, a portion of system memory (e.g., RAM 24) and mass storage 34 collectively store an operating system such as the AIX® operating system from IBM Corporation to coordinate the functions of the various components shown in processing system 20.

In other embodiments, the present invention can be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
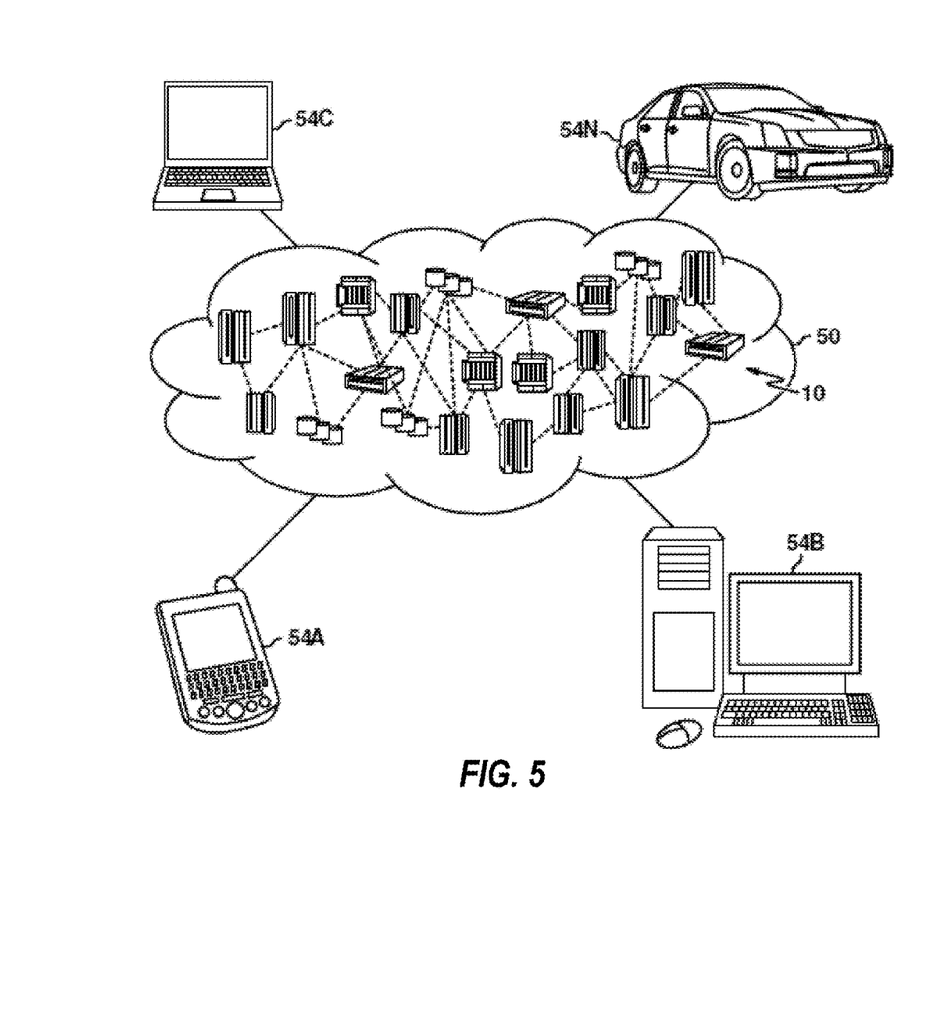
FIG. 5 illustrates a cloud computing environment according to embodiments of the present invention.

Referring now to FIG. 5, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
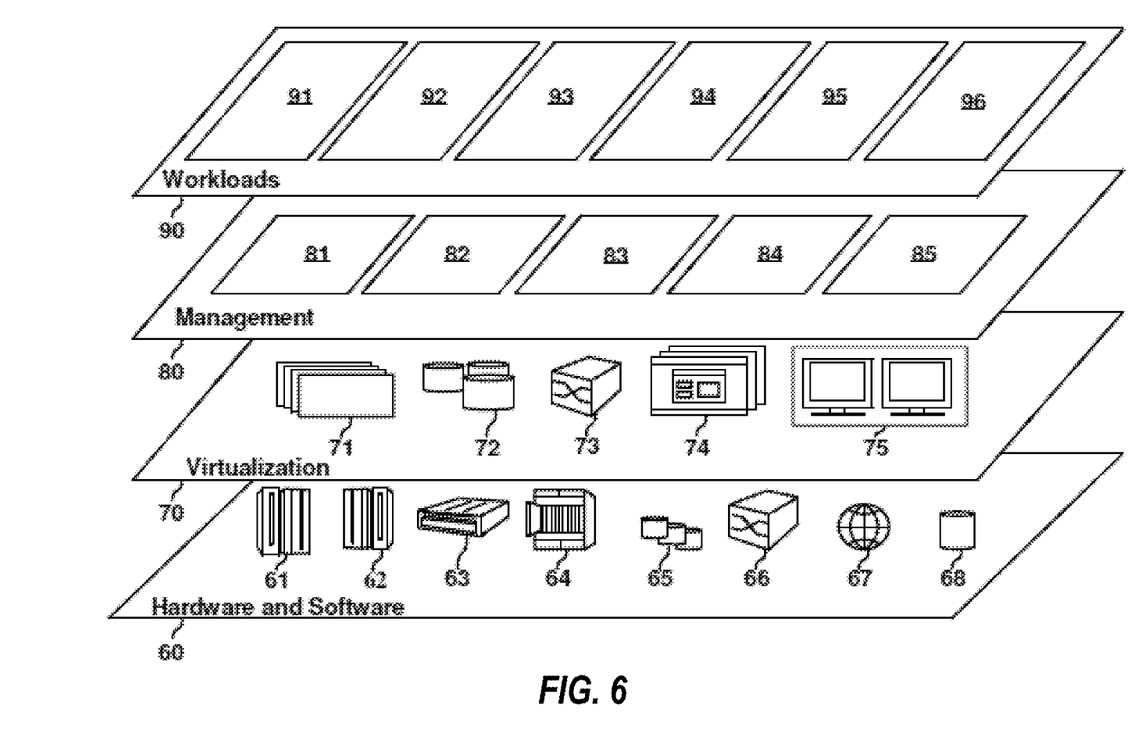
FIG. 6 illustrates abstraction model layers according to embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one embodiment, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and determining a pseudo location of a user based on UV sensor data 96.

The present techniques can be implemented as a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (e.g., the network 230 of FIG. 2), for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the present invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques described herein.

What is claimed is:

1. A computer-implemented method for determining a pseudo location of a user, the method comprising:
    collecting, by a processing device, ultraviolet (UV) sensor data from a UV sensor of a user device of the user;
    analyzing, by the processing device, the UV sensor data by comparing the UV sensor data to a UV profile for a geographic area; and
    determining, by the processing device, the pseudo location of the user based at least in part on the UV sensor data and the UV profile without using GPS data.

2. The computer-implemented method of claim 1, further comprising:
    generating, by the processing device, the UV profile for the geographic area based at least in part on prior UV sensor data collected by the user device of the user.

3. The computer-implemented method of claim 1, wherein the pseudo location is one of indoors or outdoors.

4. The computer-implemented method of claim 1, wherein the UV sensor data comprises a UV type, and wherein the UV type is one of UV-a or UV-b.

5. The computer-implemented method of claim 1, further comprising:
    collecting, by the processing device, additional UV sensor data from UV sensors of additional user devices of additional users; and
    generating, by the processing device, the UV profile for the geographic area based at least in part on prior UV sensor data collected by the user device of the user, and based at least in part on the additional UV sensor data collected by the additional user devices of the additional users.

6. The computer-implemented method of claim 1, wherein the UV sensor data is associated with an environmental parameter.

7. The computer-implemented method of claim 1, wherein determining the pseudo location of the user is based at least in part on data received from an accelerometer of the user device.

8. A system for determining a pseudo location of a user, the system comprising:
    a memory comprising computer readable instructions; and
    a processing device for executing the computer readable instructions for performing a method, the method comprising:
        collecting, by the processing device, ultraviolet (UV) sensor data from a UV sensor of a user device of the user;
        analyzing, by the processing device, the UV sensor data by comparing the UV sensor data to a UV profile for a geographic area; and
        determining, by the processing device, the pseudo location of the user based at least in part on the UV sensor data and the UV profile without using GPS data.

9. The system of claim 8, wherein the method further comprises:
    generating, by the processing device, the UV profile for the geographic area based at least in part on prior UV sensor data collected by the user device of the user.

10. The system of claim 8, wherein the pseudo location is one of indoors or outdoors.

11. The system of claim 8, wherein the UV sensor data comprises a UV type, and wherein the UV type is one of UV-a or UV-b.

12. The system of claim 8, wherein the method further comprises:

collecting, by the processing device, additional UV sensor data from UV sensors of additional user devices of additional users; and generating, by the processing device, the UV profile for the geographic area based at least in part on prior UV sensor data collected by the user device of the user, and based at least in part on the additional UV sensor data collected by the additional user devices of the additional users.

13. The system of claim 8, wherein the UV sensor data is associated with an environmental parameter.

14. The system of claim 8, wherein determining the pseudo location of the user is based at least in part on data received from an accelerometer of the user device.

15. A computer program product for determining a pseudo location of a user, the computer program product comprising:

a computer readable storage medium having program instructions embodied therewith, wherein the computer readable storage medium is not a transitory signal per se, the program instructions executable by a processing device to cause the processing device to perform a method comprising:

collecting, by the processing device, ultraviolet (UV) sensor data from a UV sensor of a user device of the user;

analyzing, by the processing device, the UV sensor data by comparing the UV sensor data to a UV profile for a geographic area; and determining, by the processing device, the pseudo location of the user based at least in part on the UV sensor data and the UV profile without using GPS data.

16. The computer program product of claim 15, wherein the method further comprises:

generating, by the processing device, the UV profile for the geographic area based at least in part on prior UV sensor data collected by the user device of the user.

17. The computer program product of claim 15, wherein the pseudo location is one of indoors or outdoors.

18. The computer program product of claim 15, wherein the UV sensor data comprises a UV type, and wherein the UV type is one of UV-a or UV-b.

19. The computer program product of claim 15, wherein the method further comprises:

collecting, by the processing device, additional UV sensor data from UV sensors of additional user devices of additional users; and generating, by the processing device, the UV profile for the geographic area based at least in part on prior UV sensor data collected by the user device of the user, and based at least in part on the additional UV sensor data collected by the additional user devices of the additional users.

20. The computer program product of claim 15, wherein the UV sensor data is associated with an environmental parameter.

* * * * *